US007185354B2

(12) United States Patent
Hashimoto

(10) Patent No.: US 7,185,354 B2
(45) Date of Patent: Feb. 27, 2007

(54) APPARATUS AND METHOD FOR CONFIRMING DATA BROADCASTING

(75) Inventor: Ken Hashimoto, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 917 days.

(21) Appl. No.: 09/767,716

(22) Filed: Jan. 24, 2001

(65) Prior Publication Data

US 2001/0053679 A1 Dec. 20, 2001

(30) Foreign Application Priority Data

Jun. 16, 2000 (JP) ............................ 2000-181688

(51) Int. Cl.
*G06F 3/00* (2006.01)
*H04N 7/173* (2006.01)

(52) U.S. Cl. .......................... 725/38; 725/54; 725/110; 725/116; 725/131; 725/146

(58) Field of Classification Search ........ 725/109–110, 725/107, 112–113, 116, 146, 138, 39, 54, 725/44, 131, 38; 709/224; 348/461, 462, 348/553
See application file for complete search history.

(56) References Cited

U.S. PATENT DOCUMENTS 5,576,755 A * 11/1996 Davis et al. .................. 725/48
5,585,838 A * 12/1996 Lawler et al. ................ 725/54
5,613,190 A * 3/1997 Hylton ........................ 725/81
5,761,429 A * 6/1998 Thompson .................. 709/224
5,883,665 A * 3/1999 Galler et al. ................ 725/107
5,890,171 A * 3/1999 Blumer et al. ........... 715/501.1
5,917,537 A * 6/1999 Lightfoot et al. .............. 725/4
5,943,048 A * 8/1999 Nyman ....................... 345/808
5,974,445 A * 10/1999 Pivnichny et al. .......... 709/203
6,182,072 B1 * 1/2001 Leak et al. ................. 725/110
6,807,676 B1 * 10/2004 Robbins et al. ............... 725/39
6,886,178 B1 * 4/2005 Mao et al. .................... 725/52

FOREIGN PATENT DOCUMENTS

JP 010060031 3/1989

* cited by examiner

*Primary Examiner*—Kieu-Oanh Bui
(74) *Attorney, Agent, or Firm*—Staas & Halsey LLP

(57) ABSTRACT

The system of the present invention analyzes the content of digital broadcasting, generates an operational procedure for selecting selection items that can be controlled by a remote control, etc., in a prescribed order and instructs a browser to do perform selection operations at specific intervals according to the operational procedure. The browser automatically displays each page of the content at specific intervals according to the instruction, and a user confirms the displayed information.

11 Claims, 17 Drawing Sheets

START
S31 OBTAINS A BML DOCUMENT.
S32 EXTRACTS AN INDEX NUMBER.
S33 ANALYZES A LINK.
S34 GENERATES A LIST OF LINK STATUSES.
S35 DETERMINES A SELECTION ORDER.
S36 GENERATES A SELECTION ORDER LIST.
S37 ADDS THE SELECTION ORDER LIST TO THE BML DOCUMENT.
END

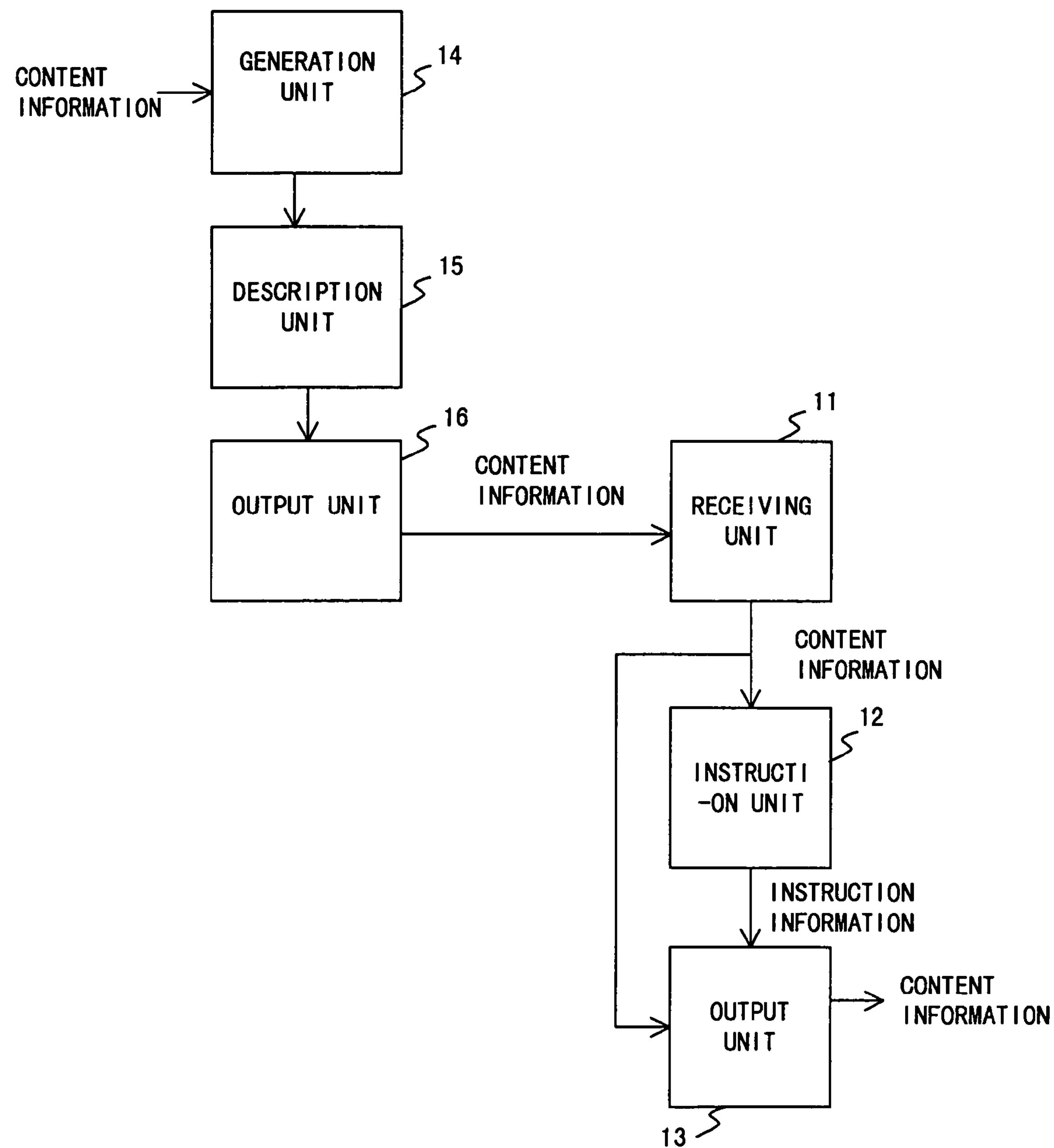
F I G. 1

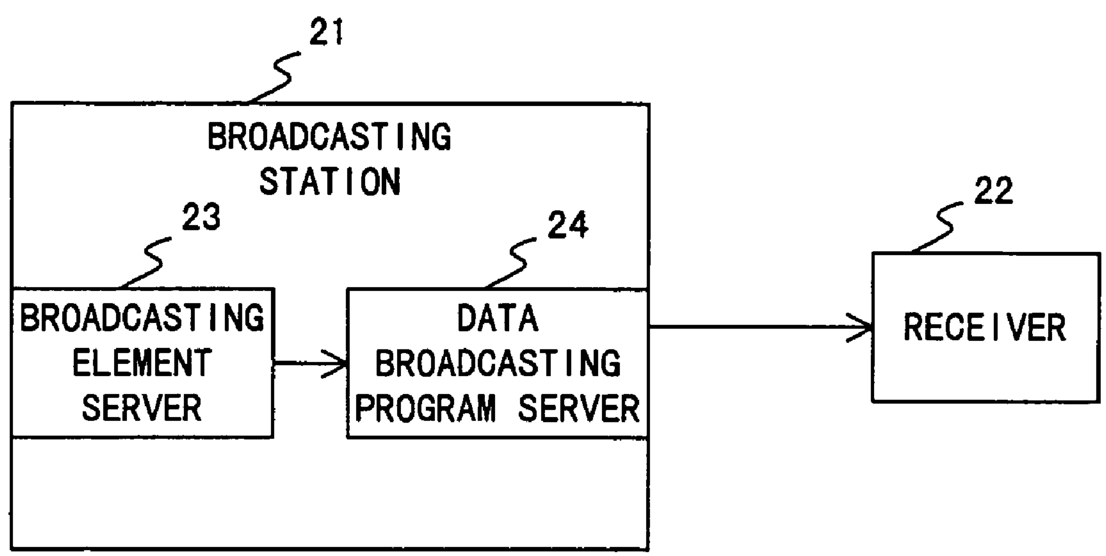
F I G. 2

```
~

#button1 {
  top: 450px; left: 92px; width: 90px; height: 38px;
  nav-index: 0; nav-up: 0; nav-down: 0; nav-left: 4; nav-right: 2      (L1)
}
#button2 {
  top: 450px; left: 224px; width: 90px; height: 38px;
  nav-index: 2; nav-up: 2; nav-down: 2; nav-left: 0; nav-right: 3      (L2)
}
#button3 {
  top: 450px; left: 356px; width: 90px; height: 38px;
  nav-index: 3; nav-up: 3; nav-down: 3; nav-left: 2; nav-right: 4      (L3)
}
#button4 {
  top: 450px; left: 488px; width: 90px; height: 38px;
  nav-index: 4; nav-up: 4; nav-down: 4; nav-left: 3; nav-right: 0      (L4)
}

~

function Focus1() { changeButton("b1-focus.png", 5 /* red */); }       (L5)
function Blur1()  { changeButton("b1-blur.png", 13 /* blue */); }      (L6)

~

function Click1() { browser.launchDocument("second.bml", "cut"); }     (L7)

~

<object id="button1" type="image/X-arib-png" data="b1-blur.png"        (L8)
                onfocus="Focus1();" onblur="Blur1();" onclick="Click1();"
                class="blue-border"/>

~
```

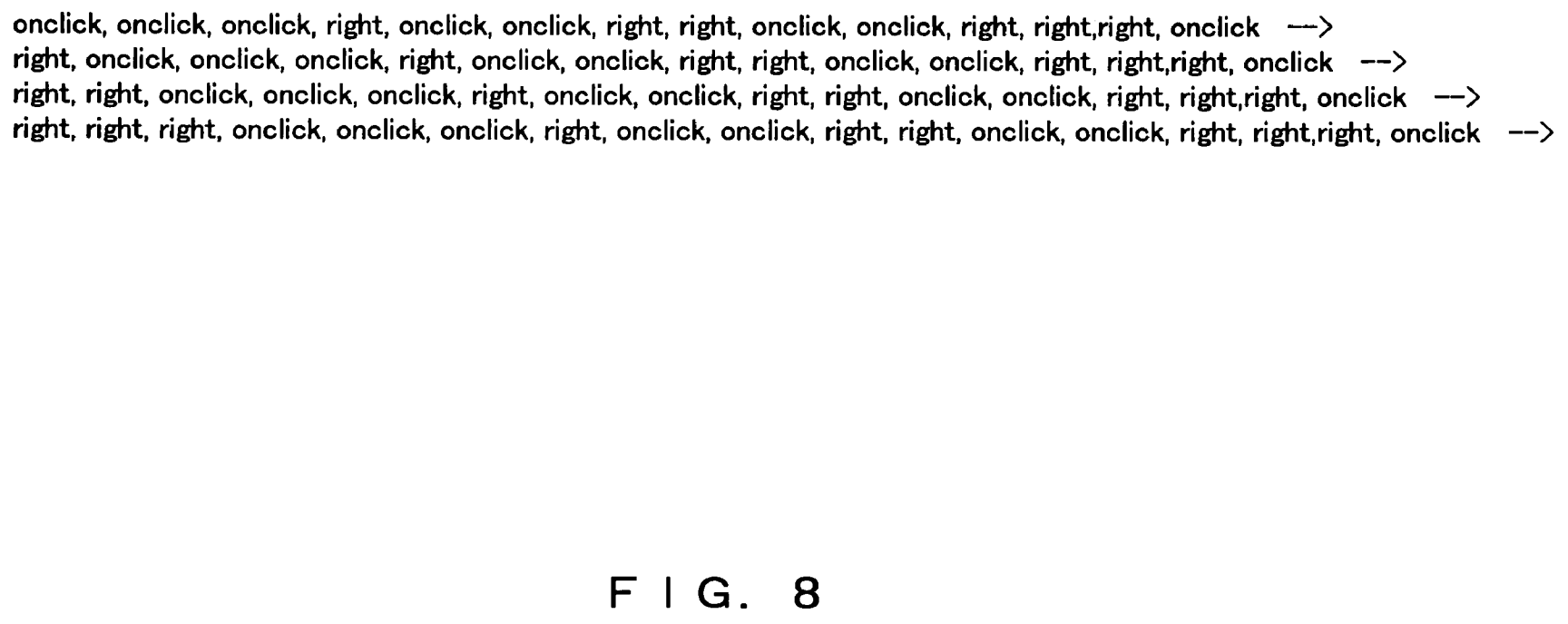

F I G. 4 onclick, onclick, onclick, right, onclick, onclick, right, right, onclick, onclick, right, right,right, onclick -->
right, onclick, onclick, onclick, right, onclick, onclick, right, right, onclick, onclick, right, right,right, onclick -->
right, right, onclick, onclick, onclick, right, onclick, onclick, right, right, onclick, onclick, right, right,right, onclick -->
right, right, right, onclick, onclick, onclick, right, onclick, onclick, right, right, onclick, onclick, right, right,right, onclick -->

F I G. 8

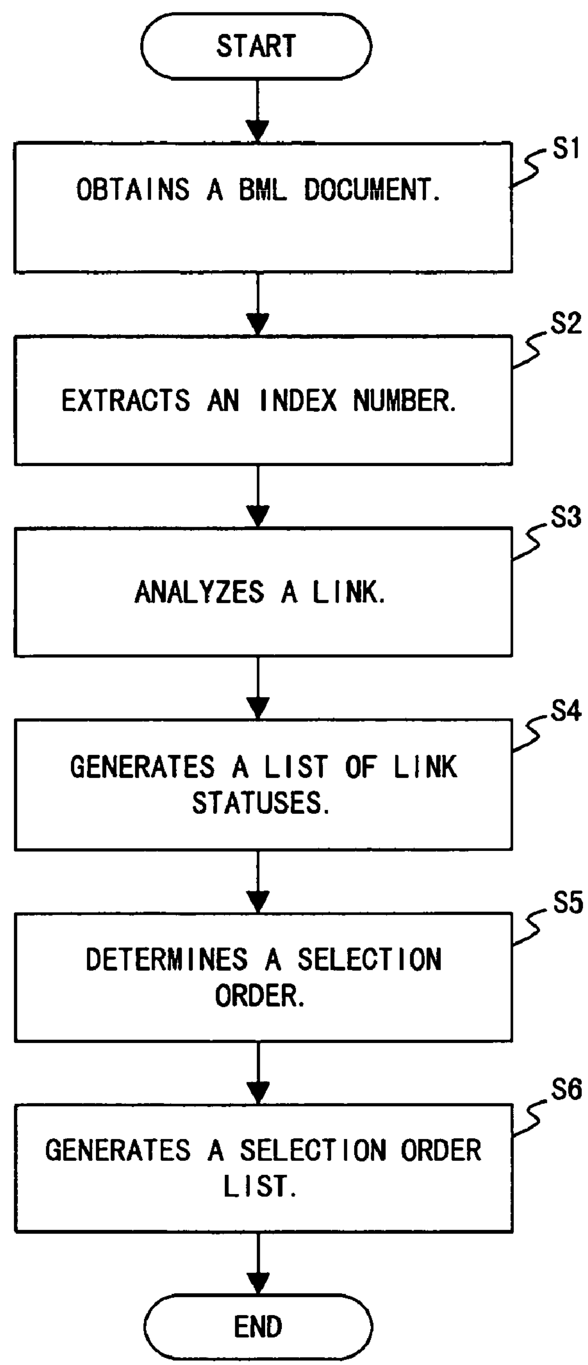
F I G. 9

```
<?xml version="1.0" encoding="EUC-JP" ?>
<?bml bml-version="1.0" ?>
<!--
<!DOCTYPE bml PUBLIC "+//ARIB STD-B24:1999//DTD BML Document//JA" "bml_1_0.dtd">
-->

<!-- startup.bml (START-UP DOCUMENT) -->
<!-- 2000.03.25 -->

<!-- #control.script# -->
<!-- onclick, onclick, onclick, right, onclick, onclick, right, right, onclick, onclick, right, right,right, onclick -->
<!-- right, onclick, onclick, onclick, right, onclick, onclick, right, right, onclick, onclick, right, right,right, onclick -->
<!-- right, right, onclick, onclick, onclick, right, onclick, onclick, right, right, onclick, onclick, right, right,right, onclick -->
<!-- right, right, right, onclick, onclick, onclick, right, onclick, onclick, right, right, onclick, onclick, right, right,right, onclick -->
<!-- #/control.script# -->

~
```

L9

F I G. 1 2

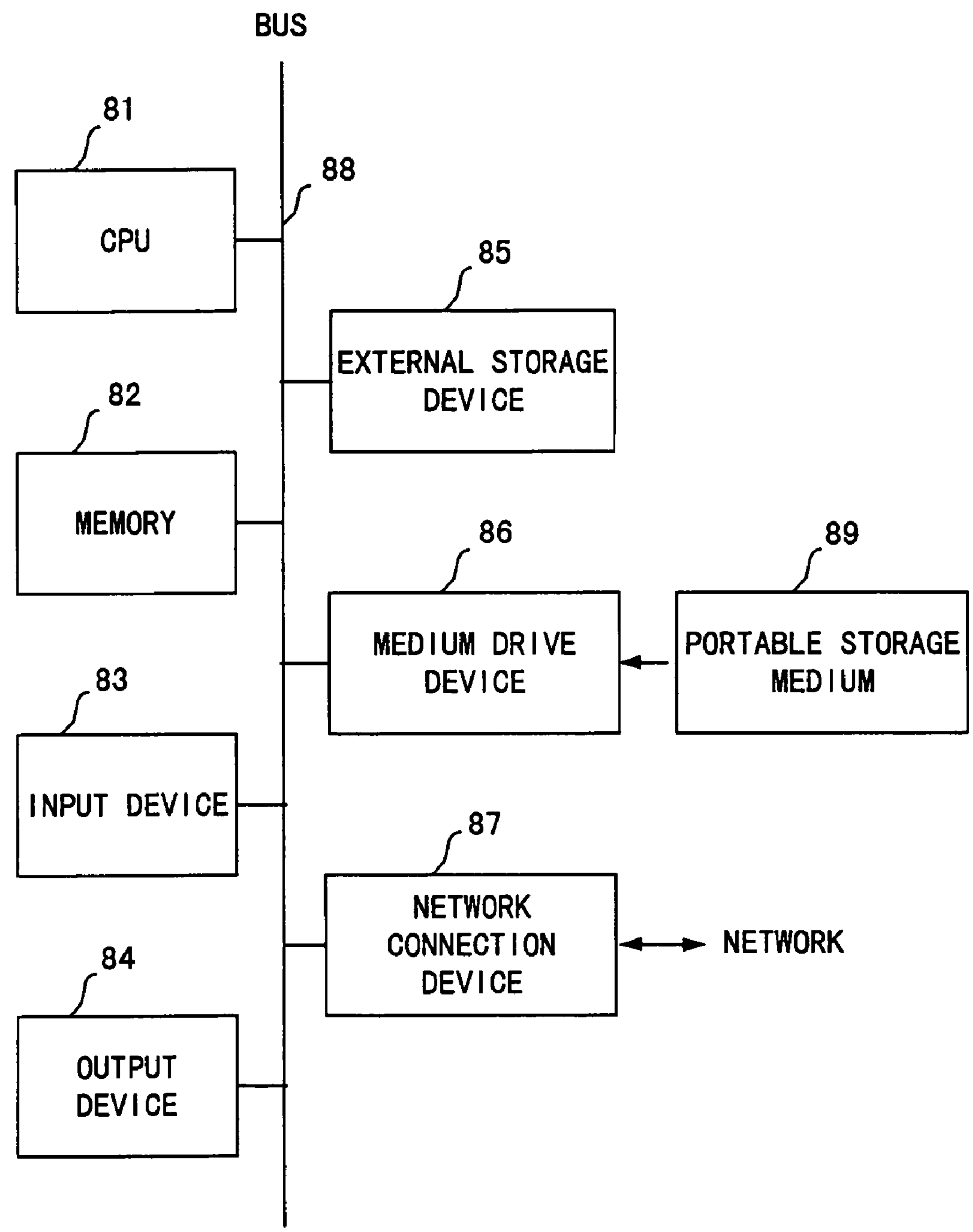
F I G. 1 6

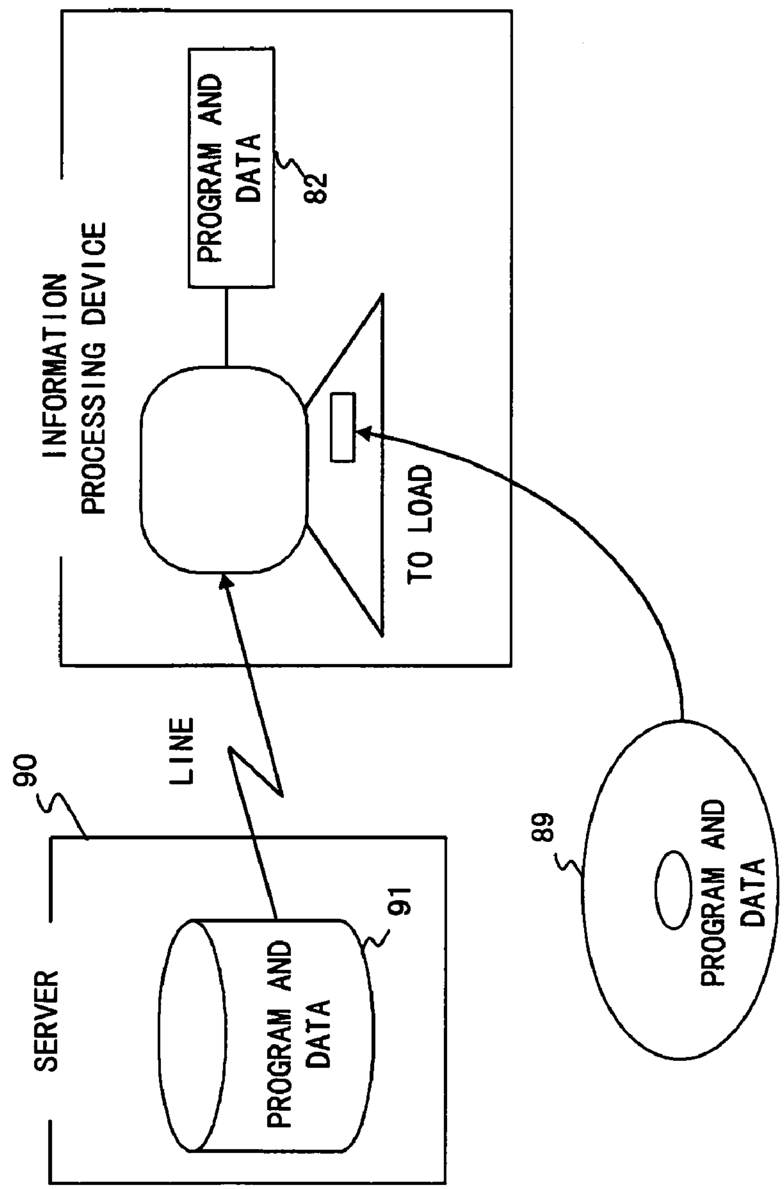
F I G. 1 7

APPARATUS AND METHOD FOR CONFIRMING DATA BROADCASTING

BACKGROUND OF THE INVENTION

1. Field of the Invention

The present invention relates to an apparatus for confirming the content of data broadcasting, including selection items on a screen in digital broadcasting and a method thereof.

2. Description of the Related Art

In order to confirm a broadcasting state in conventional TV broadcasting in analogue broadcasting and TV broadcasting in digital broadcasting, a broadcasting business operator must monitor a screen using an ordinary TV receiver in the same way as a viewer monitors.

However, in the data broadcasting of digital broadcasting, a broadcasting content generally has both a hierarchical structure and a brunch structure consisting of a plurality of pages and usually one of the plurality of pages is displayed on a screen. Therefore, if an operator does not operate at all, only the page is displayed and the entire broadcasting content cannot be confirmed.

In this case, in order to confirm all the pages in real time, the operator must sequentially display all the pages by repeating the operation of designating one by one each selection item on the screen of the same TV receiver as the viewer has, using a remote control and manually switching each page.

However, since a broadcasting business operator must confirm all the pages doubly or triply, confirmation by a manual operation takes too much trouble and time, which is a problem. If an ordinary viewer wants to comprehensively confirm all the pages, he/she must also perform the same operation. Therefore, if the number of pages is great, his/her burden becomes large.

What is closest to the broadcasting content of data broadcasting in a characteristic is a Web page on the Internet. However, they are similar only in the structure of a content and their technological fields are different. In the Internet, there are no needs for monitoring a content in real time nor there is such a technology.

SUMMARY OF THE INVENTION

It is an object of the present invention to provide an apparatus for confirming the content of data broadcasting without a user, such as the viewer and broadcasting business operator of digital broadcasting, etc., performing troublesome selection operations, and a method thereof.

In the first aspect of the present invention, a receiving apparatus comprises a receiving device, an instruction device and an output device. The receiving device receives the content information of data broadcasting in digital broadcasting, and the instruction device generates instruction information for automatically selecting a plurality of selection items included in the content information from the received content information. Then, the output device outputs the content information while automatically selecting the plurality of selection items according to the generated instruction information.

In the second aspect of the present invention, a broadcasting apparatus comprises a generation device, a description device and an output device. The generation device analyzes the content information of data broadcasting in digital broadcasting and generates an operational procedure for automatically selecting a plurality of selection items included in the content information. The description device describes information about the operational procedure in the content information so that the content information can be outputted according to the generated operational procedure. Then, the output device outputs the content information in which the information about the operational procedure is described.

BRIEF DESCRIPTION OF THE DRAWINGS

FIG. 1 shows the basic configuration of the present invention.

FIG. 2 shows the configuration of a data broadcasting system.

FIG. 4 shows a first BML document.

FIG. 8 shows a selection order list.

FIG. 9 is a flowchart showing the process of a content analysis unit.

FIG. 12 shows a second BML document.

FIG. 16 shows the configuration of an information processing device.

FIG. 17 shows examples of storage media.

DESCRIPTION OF THE PREFERRED EMBODIMENTS

Figure 3:
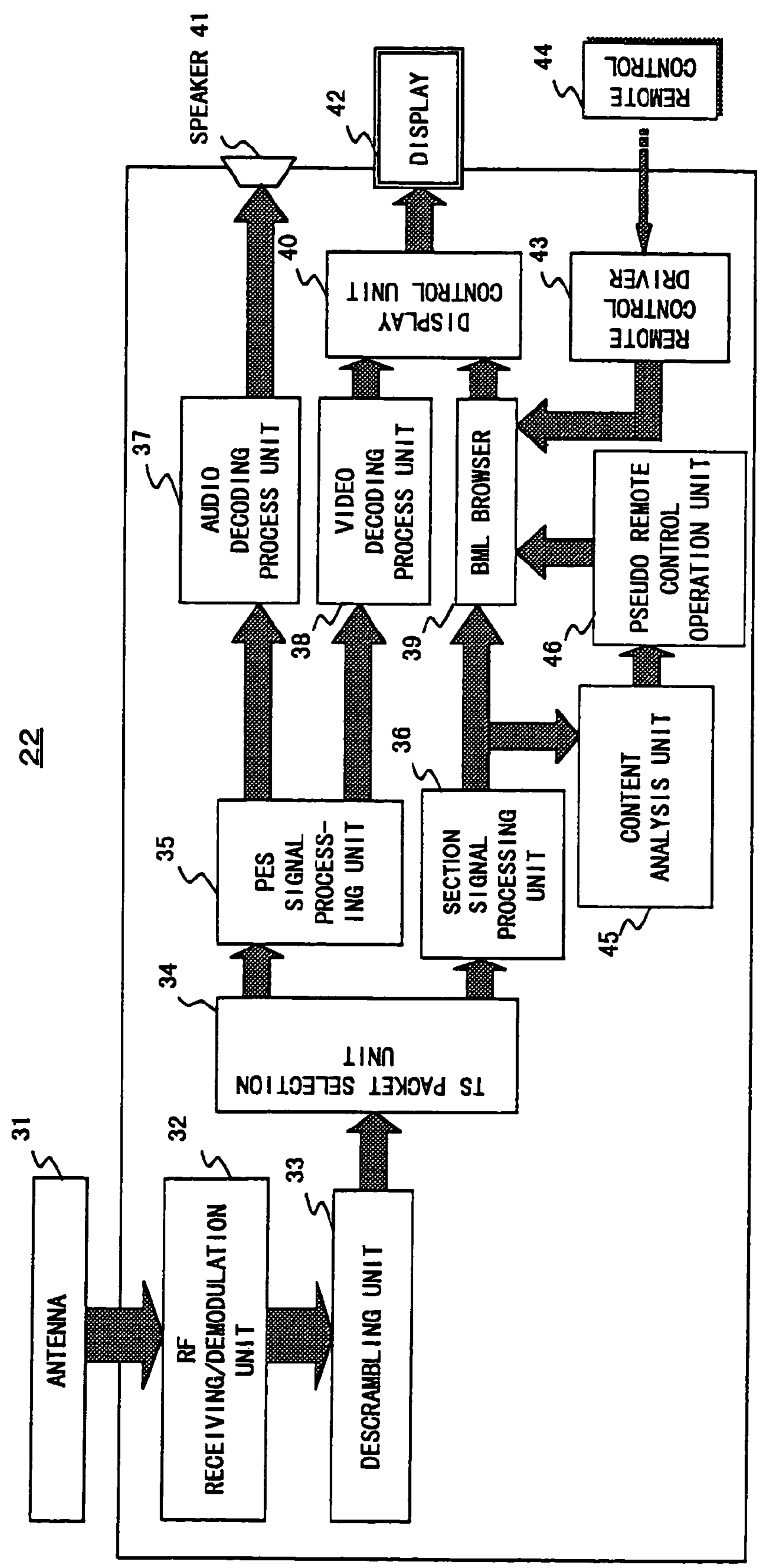
FIG. 3 shows the configuration of a first receiver.

The preferred embodiments of the present invention are described in detail below with reference to the drawings.

FIG. 1 shows the basic configuration of both a broadcasting apparatus and a receiving apparatus.

In the first aspect of the present invention, the receiving apparatus comprises a receiving device 11, an instruction device 12 and an output device 13. The receiving device 11 receives the content information of data broadcasting in digital broadcasting, and the instruction device 12 generates instruction information for automatically selecting a plurality of selection items included in the content information from the received content information. Then, the output device 13 outputs the content information while automatically selecting the plurality of selection items according to the generated instruction information.

The receiving device 11 receives content information broadcast from a broadcasting station and transfers the information to both the instruction device 12 and output device 13. The instruction device 12 generates instruction information for instructing the performance of the same operation as that performed by a user using a remote control, etc., when selecting a selection item, according to the received content information and transfers the instruction information to the output device 13. The output device 13 automatically outputs the content information received from the receiving device 11 according to the instruction information received from the instruction device 12.

The receiving apparatus automatically generates an operational procedure for selecting a plurality of selection items in a prescribed order, for example, by analyzing content information, and the instruction device 12 generates instruction information according to the operational procedure. If the operational procedure is described in advance in received content information, the receiving apparatus automatically extracts the operational procedure, and the instruction device 12 generates instruction information according to the extracted operational procedure.

According to such a receiving apparatus, since a selection operation required to output a broadcasting content is automatically performed, a broadcasting business operator or a viewer can easily confirm the broadcasting content without a troublesome operation.

In the second aspect of the present invention, the broadcasting apparatus comprises a generation device 14, a description device 15 and an output device 16. The generation device 14 analyzes the content information of data broadcasting in digital broadcasting and generates an operational procedure for automatically selecting a plurality of selection items included in the content information. The description device 15 describes information about the operational procedure in the content information so that the content information can be outputted according to the generated operational procedure. Then, the output device 16 outputs the content information in which the information about the operational procedure is described.

The generation device 14 analyzes content information for broadcasting, generates the same operational procedure as that taken when a user selects a selection item using a remote control, etc., and transfers the procedure to the description device 15. The description device 15 describes received information about the operational procedure in the content information in such a way that the receiving apparatus can recognize the information about the operational procedure and transfers the content information to the output device 16. The output device 16 outputs the received content information outside in order to broadcast it.

According to such a broadcasting apparatus, since the operational procedure on a selection operation required to output a broadcasting content is attached to the content, on receipt of this content, a receiving can automatically perform the selection operation and can output the content. Therefore, a broadcasting business operator or a viewer can easily confirm the broadcasting content without a troublesome selection operation.

For example, the receiving device 11 shown in FIG. 1 corresponds to the antenna 31 and RF receiving/demodulation unit 32 shown in FIGS. 3 and 11, which are described later. The instruction device 12 shown in FIG. 1 corresponds to the pseudo remote control operation unit 46 shown in FIGS. 3 and 11. The output device 13 shown in FIG. 1 corresponds to the BML browser 39, display control unit 40 and display 42 shown in FIGS. 3 and 11. For example, the generation device 14, description device 15 and output device 16 correspond to the broadcasting material server 23 shown in FIG. 2, which are described later.

In this preferred embodiment, the same operation as that performed for the content of data broadcasting when a user selects a selection item using a remote control is falsely instructed to a browser. In this way, since item selection or page turning is automatically performed without an actual selection operation, a user can easily confirm the contents of all the pages. In order to instruct a browser to operate, the following methods are used.

(1) A receiving apparatus automatically extracts a selectable item from a provided broadcasting content and inputs a signal for indicating the selection operation of the extracted item to the browser.

(2) A content writer describes information about menu selection for automatic confirmation in advance in a broadcasting content. Then, a receiving apparatus recognizes the description and inputs a signal for indicating a corresponding selection operation to a browser.

The content of data broadcasting in digital broadcasting is described in a BML (Broadcast Markup Language) stipulated by Association of Radio Industries and Businesses (ARIB) or a B-XML (Broadcast XML). The BML and B-XML both are multimedia coding methods based on an XML (extensible markup language).

According to method (1) described above, the receiving apparatus decodes the description content of a BML or B-XML, and analyzes the selection menu structure using a remote control, etc. Then, the apparatus falsely generates the same signal as that generated when being instructed by the remote control, based on the obtained information, and automatically performs a display process that covers all the selection items. Since in this way, all the pages of a broadcasting content are automatically displayed, a user can easily confirm the pages without manually operating a selection menu.

According to method (2), a writer describes a command that can be read only by a receiving apparatus for automatic confirmation in advance in a broadcasting content using a command or annotation sentence made by extending a BML or B-XML. Although an ordinary receiving apparatus does not recognize the command or annotation sentence nor performs a corresponding operation, the receiving apparatus for automatic confirmation decodes the command or annotation sentence and performs an instructed operation.

Only if information about a selection menu structure for automatic confirmation, etc., or information about an automatic confirmation operation is described by such a method, a receiving apparatus for automatic confirmation can falsely generates a signal for automatically selecting all the items and can automatically display all the pages of a broadcasting content.

Since a writer can describe an automatic confirmation operation in advance, even a menu structure that cannot be easily judged by the analysis of a broadcasting content, such as a selection menu by script can be automatically confirmed. Therefore, a user can do a reliable and efficient confirmation work.

FIG. 2 shows the configuration of the data broadcasting system of this preferred embodiment. The digital broadcasting system shown in FIG. 2 is composed of a broadcasting station 21 and a user's receiver 22. The broadcasting station 21 comprises a broadcasting material server 23 and a data broadcasting program server 24. The receiver 22 is used, for example, for a broadcasting business operator to monitor a broadcasting content in real time or an ordinary viewer to receive digital broadcasting.

The broadcasting material server 23 registers contents in a BML document format, which are materials for data broadcasting. The data broadcasting program server 24 registers broadcasting contents for programs that are selected from the contents registered in the broadcasting material server 23, and broadcasts the programs according to a broadcasting schedule. The broadcast data reach a receiver 22 via a broadcasting satellite, etc. The receiver 22 can also receive not only data broadcasting, but also TV broadcasting.

FIG. 3 shows the configuration of a receiver 22 adopting method (1) described above. The receiver shown in FIG. 3 comprises an antenna 31, an RF (radio Frequency) receiving/demodulation unit 32, a descrambling unit 33, a TS (Transport Stream) packet selection unit 34, a PES (Packetized Elementary Stream) signal processing unit 35, a section signal processing unit 36, an audio decoding process unit 37, a video decoding process unit 38, a BML browser 39, a display control unit 40, a speaker, a display 42, a remote control driver 43, a remote control 44, a content analysis unit 45 and a pseudo remote control operation unit 46.

The antenna 31 receives RF signals. The RF receiving/demodulation unit 32 demodulates the received signals and converts the signals to baseband signals. The descrambling unit 33 descrambles pay broadcasting, etc. The TS packet selection unit 34 breaks down the baseband signals into PES signals and section signals according to the standards of MPEG-2 (Moving Picture Experts Group-2) Systems and extracts necessary signals using the ID of a packet signal. In this way, PES signals and section signals are selected.

The PES signal processing unit 35 converts the selected PES signals into a continuous digital audio stream and a continuous digital video stream, and the section signal processing unit 36 converts the selected section signals into the original BML content file. The audio decoding process unit 37 converts the digital audio stream to an analog audio stream, and the video decoding process unit 38 converts the digital video stream to an analog video stream.

The BML browser 39 displays the content file described in a BML. The display control unit 40 composes a picture from the video decoding process unit 38 and data from the BML browser 39, and displays it on the screen of the display 42. The speaker 41 outputs voice from the audio decoding process unit 37.

The remote control driver 43 notifies the BML browser 39 of a control signal received from the remote control 44, and the BML browser 39 modifies the data display according to the reported signal.

The content analysis unit 45 analyzes the description of the BML content generated by the section signal processing unit 36 and extracts information about a selection item in the content. Then, the unit 45 generates a selection order list (remote control operational procedure) covering all the selection states of the selection items that a viewer can read using the remote control 44, etc., and transfers the list to the pseudo remote control operation unit 46. This selection order list is generated in a table format or another format.

The pseudo remote control operation unit 46 falsely generates the same control signal as a signal from the remote control driver 43, based on information received from the content analysis unit 4S, and notifies the BML browser 39 of the signal. In this way, the same selection operation as performed when a viewer issues an instruction using the remote control 44, etc., is automatically instructed at specific intervals. In this case, the BML browser 39 displays each page of the BML content at specific intervals according to instructions from the pseudo remote control operation unit 46.

In this way, if both a content analysis unit 45 and pseudo remote control operation unit 46 are provided, a user can monitor the states of a variety of pages without operating a remote control.

Figure 5:
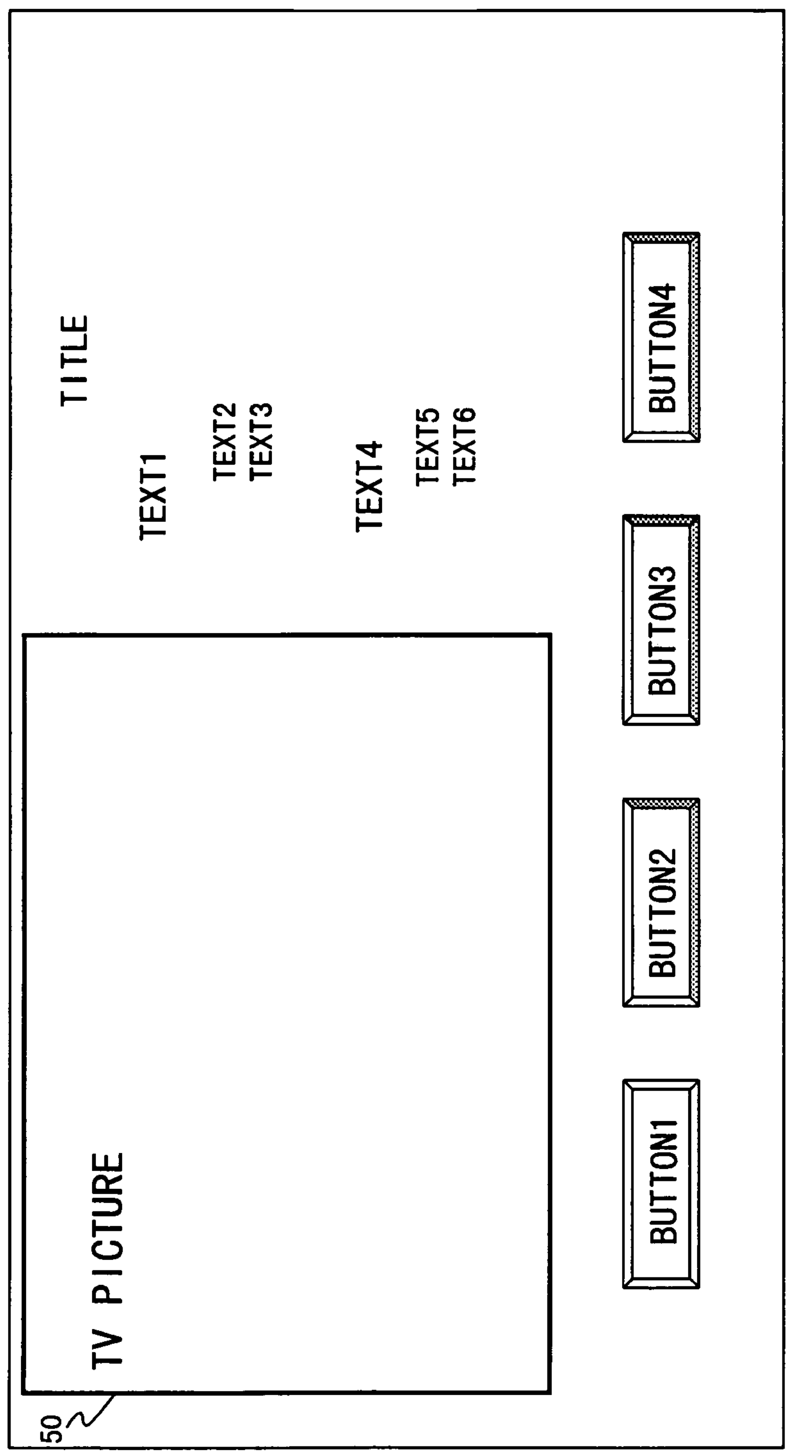
FIG. 5 shows a broadcasting screen.

FIG. 4 shows an example of the BML document of a broadcasting content. FIG. 5 shows the broadcasting screen of this content. In the screen shown in FIG. 5, a TV picture 50 corresponds to a video stream outputted from the video decoding process unit 38, and the other parts correspond to data broadcasting. In this example, the title of a program, text 1 through 6 and selection buttons 1 through 4 are displayed as data.

In the BML document shown in FIG. 4, the index of the selection button shown in FIG. 5 is described as nav-index. In this example, the nav-indexes of buttons 1, 2, 3 and 4 are "0" (L1), "2" (L2), "3" (L3) and "4" (L4), respectively. Nav-up, nav-down, nav-right and nav-left indicate remote control operations to shift a focus point in a state where each button is focussed on.

In this example, nav-up and nav-down indicate an operation to hold the focus point on a button pointed to by nav-index, and nav-right and nav-left indicate operations to shift the focus point to the right and left of the button. However, it is assumed to be defined that a button located to the right of button 4 is button 1, and a button located to the left of button 1 is button 4.

For example, both nav-up and nav-down of button 1 (L1) correspond to index "0" of button 1, and nav-right and nav-left correspond to index "2" of button 2 and index "4" of button 4, respectively.

Functional Focus1 ( ) of L5 is a function to define the display color (red) of a button when the button is focussed on, and function Blur1 ( ) of L6 is a function to define the display color (blue) of a button when the button is not focussed on. Function Click1 ( ) of L7 is a function to define an operation required when a button is clicked by the determination operation of a remote control.

In this example, a display screen is switched from the current page to another page described in a BML document of second.bml.

Description L8 defines the procedure (operation) of an object of button1. In this example, if operations of "onfocus", "onblur" and "onclick" are performed for button 1, functions Focus1 ( ), Blur1( ) and Click1 ( ), respectively, are called up. Then, the display is modified according to the definition of each function.

The content analysis unit 45 arranges the link states of a content by analyzing the selection item of such a BML document. Specifically, the unit 45 extracts and analyzes both the following items concerning nav-index in the BML document and parts concerning "onfocus", "onblur" and "onclick".

nav-index
nav-up
nav-down
nav-right
nav-left

Figure 6:
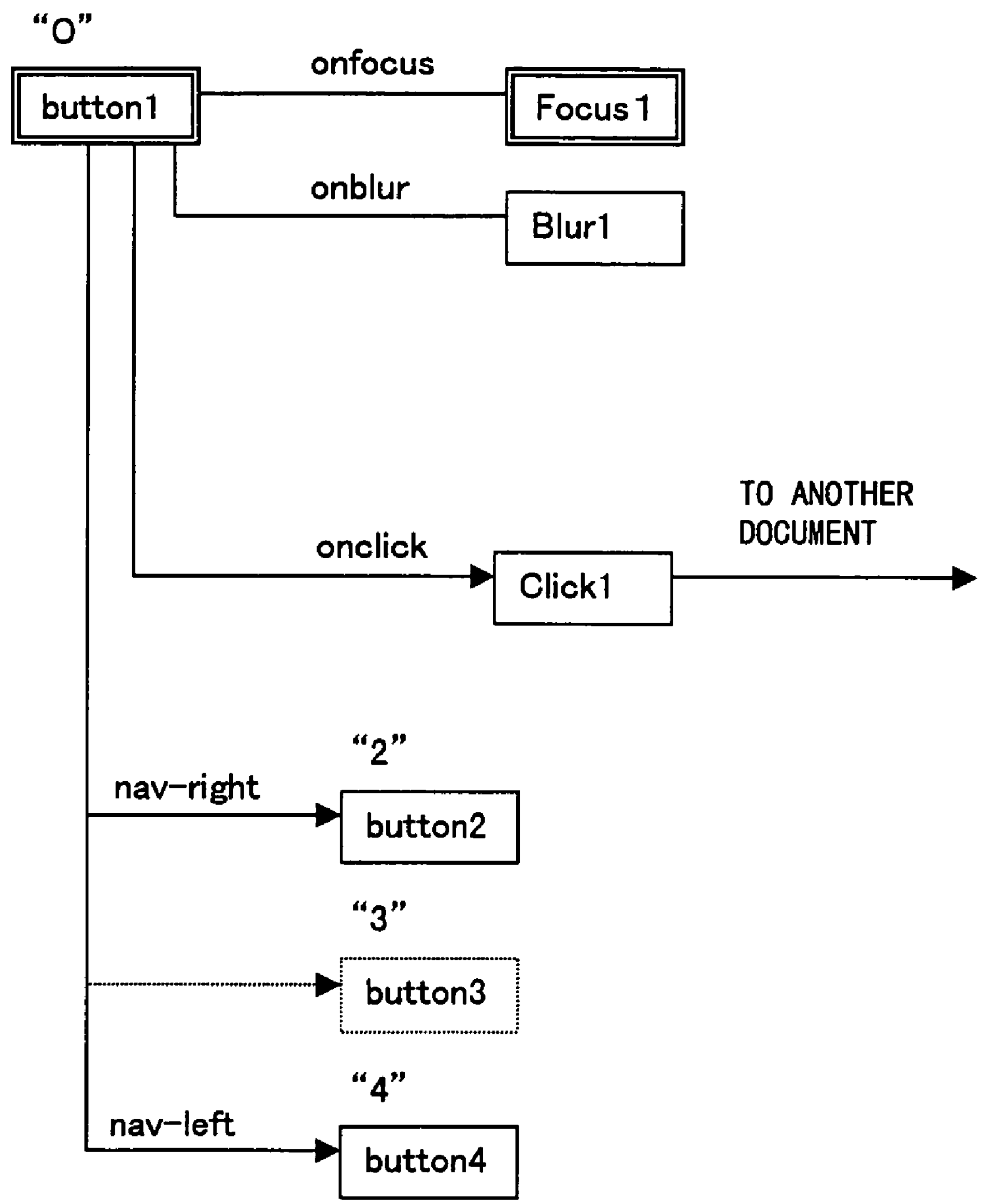
FIG. 6 shows a first analysis result.

FIG. 6 shows a first analysis result of a part concerning button 1 in the BML document shown in FIG. 4. This analysis result includes a plurality of nodes "button1", "button2", "button4", "Focus1", "Blur1" and "Click1", and a plurality of links "onfocus", "onblur", "onclick", "nav-right" and "nav-left". Nodes "button1", "button2" and "button4" correspond to indexes "0", "2" and "4", and indicate buttons 1, 2 and 4, respectively. Links "nav-right" and "nav-left" indicate operations to shift a focus point from button 1 to button 2 and button 4, respectively. However, since the focus point cannot be directly shifted from button 1 to button 3, a link between node "button3" and the node is indicated by a broken line.

Nodes "Focus1", "Blur1" and "Click1" indicate a state where button 1 is focussed on , a state where button 1 is not focussed on and a state where button 1 is selected, respectively. Links "onfocus" and "on blur" indicate processes for modifying the display color of button 1, and link "onclick"

indicates an operation to select button 1. Furthermore, node "Click1" has a link to another BML document defined by function Click1 ( ).

Figure 7:
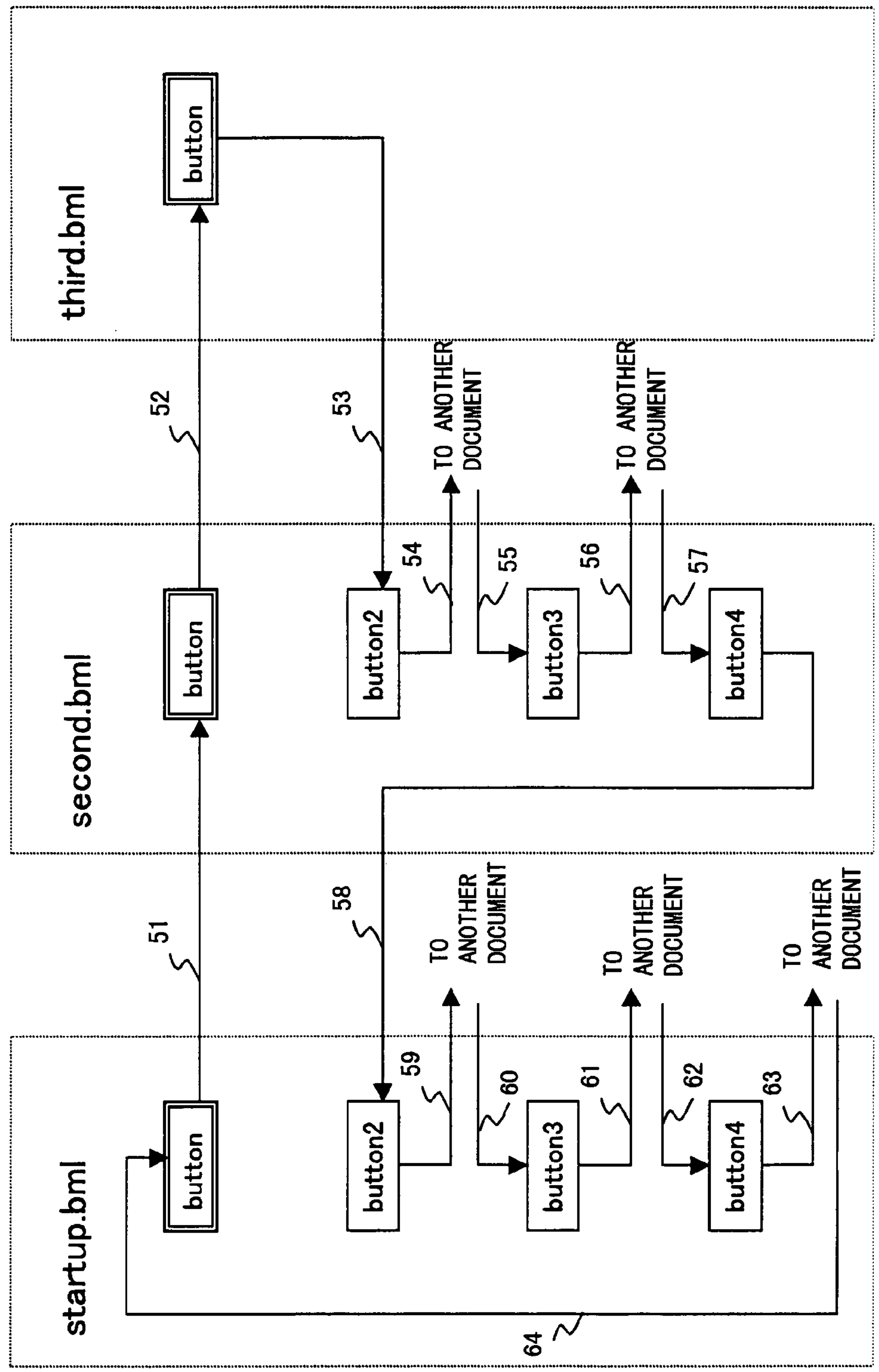
FIG. 7 shows a second analysis result.

As to other buttons 2, 3 and 4, the same procedure as that of L8 is described, which are not shown in FIG. 4. If an entire BML document, including these descriptions is analyzed, for example, an analysis result, as shown in FIG. 7, can be obtained. In this analysis result, a remote control operational procedure is arranged in such a way that all the links included in the BML content can be covered while the current focus state is being recognized. "Startup.bml" corresponds to the BML document shown in FIG. 4, and second.bml corresponds to another page of the BML document linked to the page of "startup.bml". "Third.bml" corresponds to another page of the BML document linked to the page of second.bml.

Link 51 indicates an operation to select button 1 on the page of "startup.bml" and to display the page of second.bml, and link 52 indicates an operation to select button 1 on page second.bml and to display page "third.bml". Link 53 indicates an operation to select button 1 on the page of second.bml and to display the page of "third.bml".

Link 54 indicates an operation to select button 2 on the page of second.bml and to display another page, and link 55 indicates a selection operation to return to the previous page from the displayed page. The same also applies to Links 56 and 57. Link 58 indicates an operation to select button 4 on the page of second.bml and to return to the page of startup.bml. Pairs of links 59 and 60, links 61 and 62 and links 63 and 64 indicate the same paired operations as those of a pair of links 64 and 65.

However, actually, button 1 corresponding to a condition nav-index=0 is focussed at the time of the reloading of each page. Therefore, a focus point must be shifted from button 1 to a button to be selected.

The content analysis unit 45 generates a selection order list, as shown in FIG. 8, based on the analysis result obtained in this way and transfers the list to the pseudo remote control operation unit 46. In FIG. 8, "onclick" indicates an operation to select a focussed button, and "right" indicates an operation to shift a focus point to the right. This selection order list corresponds to a remote control operation covering all the pages included in a BML content. The pseudo remote control operation unit 46 automatically instructs an action corresponding to each operation to the BML browser 39 according to the received selection order list.

Besides nav-indexes described above, the followings are also used as BML commands concerning the remote control operation.

a accesskey listtable

Of these, "a" indicates a jump to a link destination, and "accesskey" indicates an access to a link destination by the input of a key character. "listtable" corresponds to an extension function to implement menu display/selection presuming a remote control operation. These commands are extracted/analyzed like nav-index and are converted into a selection order list.

"listtable" can indicate a menu that can take over the function of a "select" element and can have an arbitrary element as an child element. The choices of the menu are expressed by "litem" elements. Although nav-index is used to instruct an operation for a picture, "listtable" is used to instruct an operation, such as "onfocus", "onblur2, etc., for an item, including text.

FIG. 9 is a flowchart showing the process of the content analysis unit 45 described above. The content analysis unit 45, first, obtains a BML document from the section signal processing unit 36 (step S1) and extracts the index number of a button to be selected (step S2).

Then, the unit 45 analyzes link states between buttons based on the description of the BML document (step S3) and generates a list for indicating the link states of the selection items of the entire content (step S4). Then, the unit 45 determines a selection order in such a way that all the selection items can be selected (step S5) and generates a selection order list (step S6). Then, the unit 45 transfers the selection order list to the pseudo remote control operation unit 46 and terminates the process.

Figure 10:
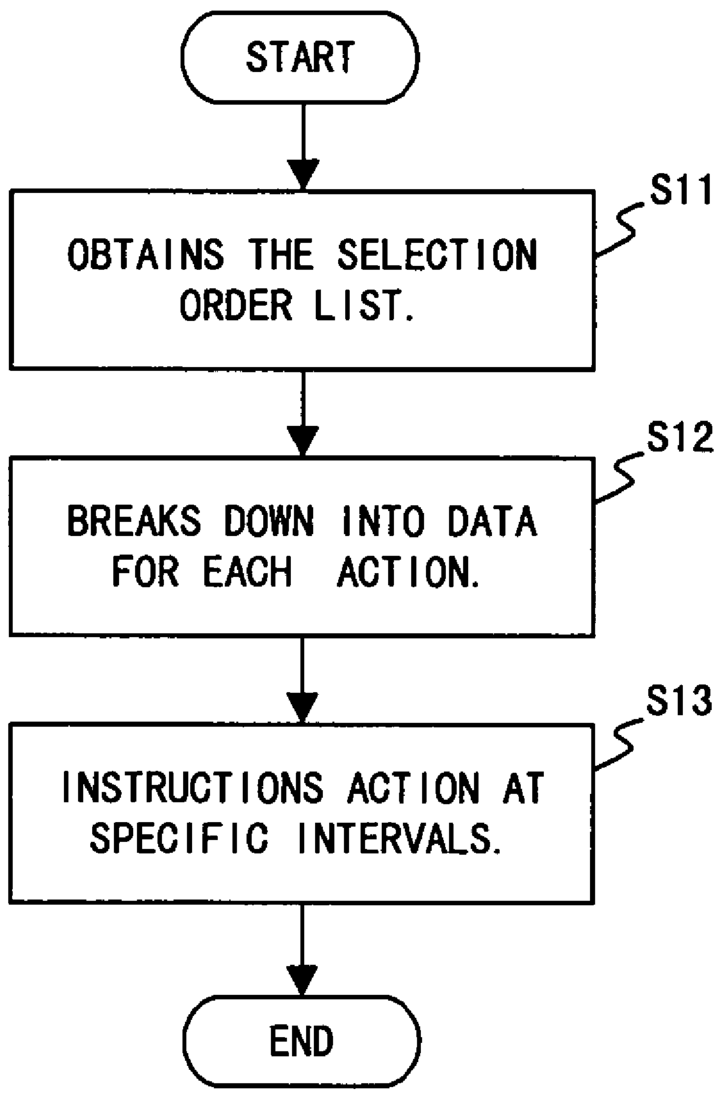
FIG. 10 is a flowchart showing the process of a pseudo remote control operation unit.

FIG. 10 is a flowchart showing the process of the pseudo remote control operation unit 46. The pseudo remote control operation unit 46, first, obtains the selection order list from the content analysis unit 45 (step S11) and analyzes data for each action (step S12). Then, the unit 45 notifies the BML browser 39 of a control signal for instructing one action at specific intervals (step S13) and terminates the process. In step S13, the action can also be instructed to the BML browser 39 at instructed intervals.

Next, the preferred embodiment adopting method (2) described above is described. FIG. 11 shows the configuration of a receiver used in this case. The receiver shown in FIG. 11 has a configuration in which only the content analysis unit 45 is replaced with a description extraction unit 71 in the receiver shown in FIG. 3.

The description extraction unit 71 extracts information for automatic confirmation described in advance in a BML content and transfers the information to the pseudo remote control operation unit 46. The pseudo remote control operation unit 46 instructs the same selection operation as that of the remote control 44 to the BML browser 39, based on the information transferred from the description extraction unit 71.

For the information for automatic confirmation, for example, a remote control operational procedure followed when a user views a content can be used. In this case, a writer describes a sequential operational procedure by a remote control after displaying the page of the first document (start-up document) of the BML content in the document as an annotation sentence. Then, description for indicating that the annotation sentence is a procedure for automatic confirmation is attached.

FIG. 12 shows an example of a BML document, including such a procedure for automatic confirmation. In this example, L9 corresponds to the procedure for automatic confirmation, and this procedure represents the same remote control operation as that of the selection order list shown in FIG. 8. The description extraction unit 71 automatically recognizes the description of the procedure for automatic confirmation by detecting #control.script#. Then, the unit 71 generates the selection order list shown in FIG. 8 based on the description and transfers the list to the pseudo remote control operation unit 46. In this way, pages are switched at specific intervals according to the selection order list.

Figure 13:
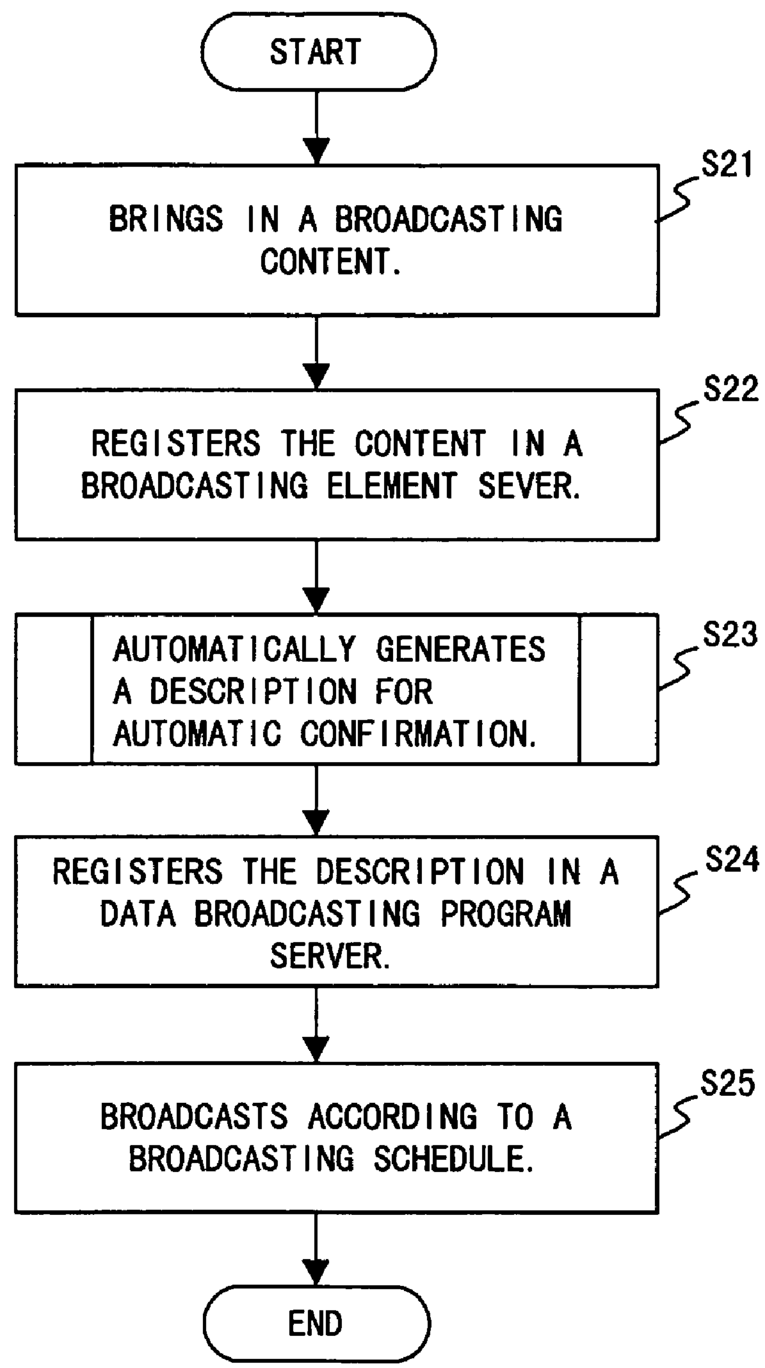
FIG. 13 is a flowchart showing the process of a broadcasting station.

FIG. 13 is a flowchart the process of the broadcasting station 21 that generates such a BML content. First, the producer of the broadcasting station brings in a broadcasting content (step S21) and registers the content in the broadcasting material server 23 (step S22). Then, the broadcasting material server 23 automatically generates description for automatic confirmation in the registered broadcasting content (step S23) and registers the broadcasting content in the data broadcasting program server 24 (step S24). Then, the data broadcasting program server 24 broadcasts the broadcasting content according to a broadcasting schedule (step S25) and terminates the process.

Figure 14:
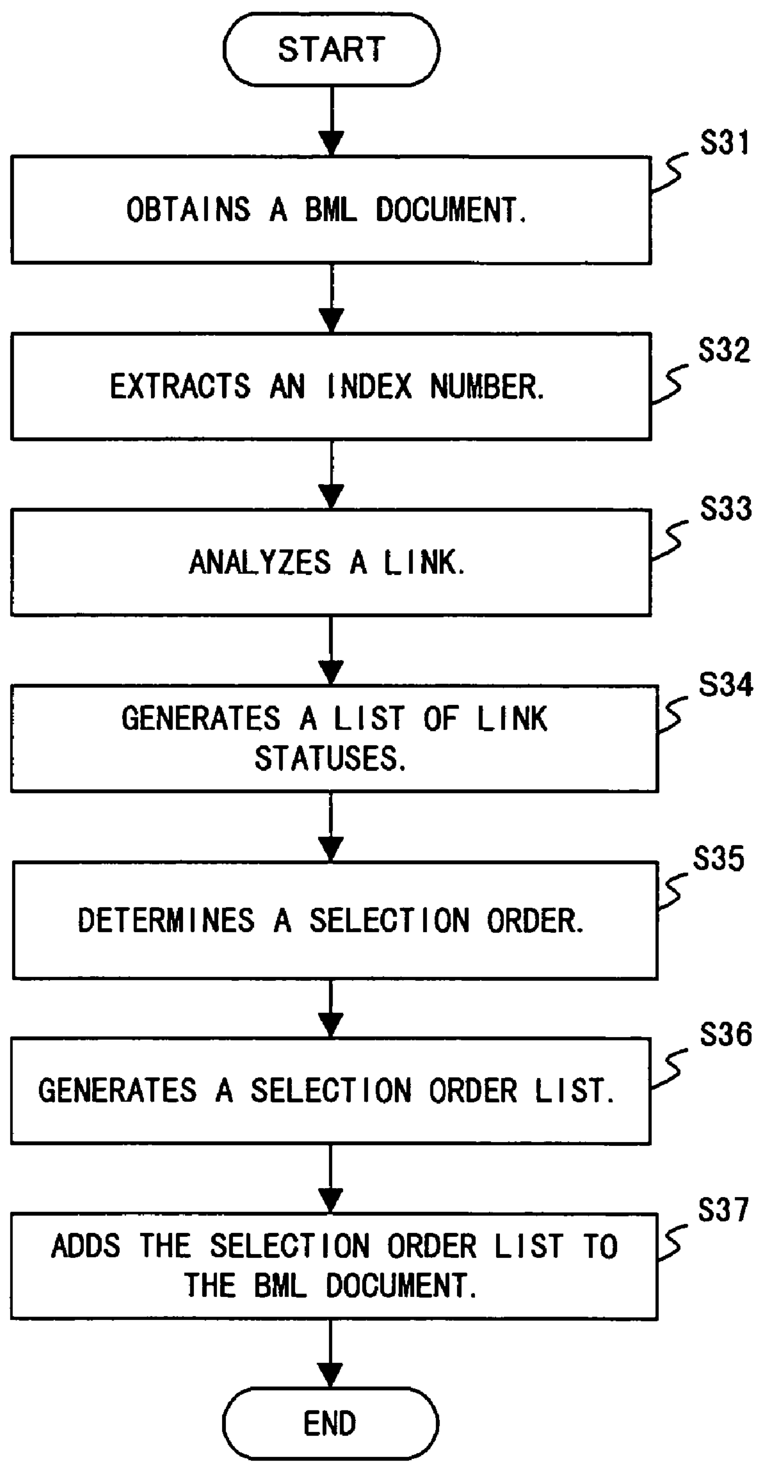
FIG. 14 is a flowchart showing an automatic generation process.

FIG. 14 is a flowchart showing the automatic generation process performed by the broadcasting material server 23 in step S13 shown in FIG. 13. In FIG. 14, processes in steps S31 through S36 are the same as the processes in steps S1 through S6. If in step S36 a selection order list is generated, the broadcasting material server 23 adds the selection order list to a BML document as description (annotation sentence) for automatic confirmation (step S37) and terminates the process.

Figure 15:
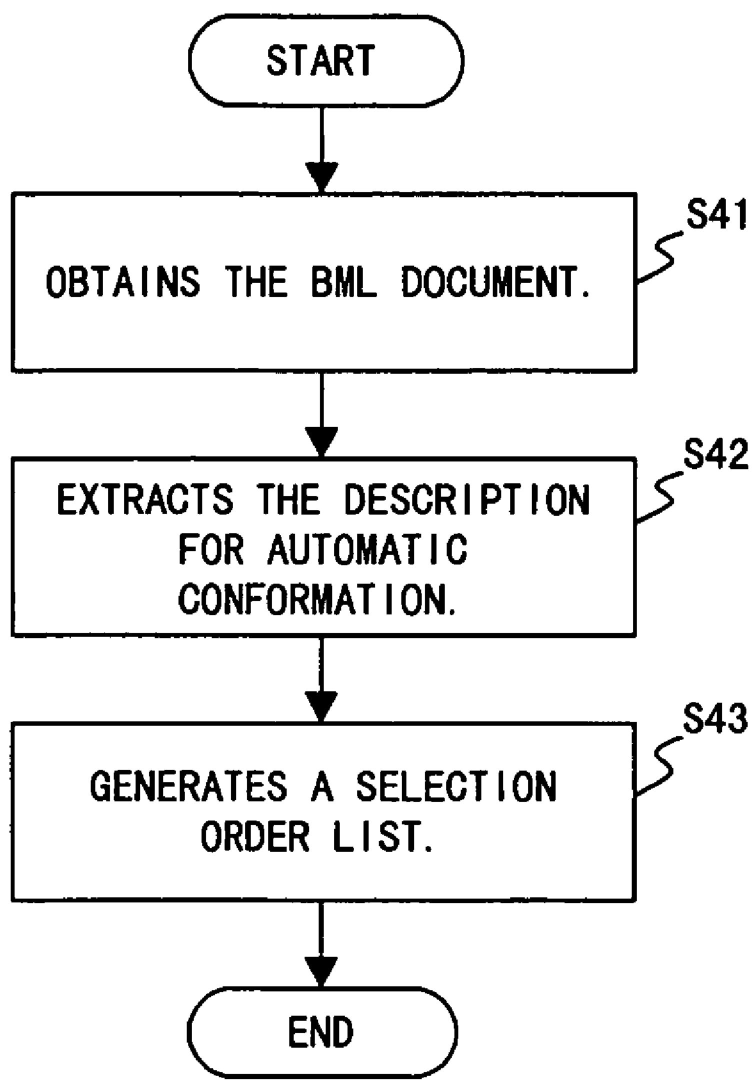
FIG. 15 is a flowchart showing the process of a description extraction unit.

FIG. 15 is a flowchart showing the process of the description extraction unit 71. The description extraction unit 71, first, obtains a BML document from the section signal processing unit 36 (step S41) and extracts description for automatic confirmation described in the annotation sentence of the BML document (step S42). Then, the unit 71 generates a selection order list from the extracted description, transfers the list to the pseudo-remote control operation unit 46 (step S43) and terminates the process.

In this way, the broadcasting business operator of digital broadcasting can monitor the content in real time during the data broadcasting and can easily check whether there is any abnormality. An ordinary viewer can easily confirm all the contents of data broadcasting.

Although in the preferred embodiments, mainly the case where a broadcasting content is described in a BML document format is described, the present invention is applicable to any broadcasting content described by an arbitrary method.]

Both the broadcasting material server 23 and data broadcasting program server 24 shown in FIG. 2 can be configured, for example, using the information processing device (computer) shown in FIG. 16. For example, the receiver shown in FIGS. 3 and 11 includes such an information processing device. The information processing device shown in FIG. 16 comprises a CPU (central processing unit) 81, a memory 82, an input device 83, an output device 84, an external storage device 85, a medium drive device 86 and a network connection device 87, and the devices are connected to each other by a bus 88.

The memory 82 includes, for example, a ROM (read-only memory), a RAM (random-access memory), etc., and stores both a program and data to be used for the process. The CPU 81 performs necessary processes by using the memory 82 and executing the program.

Figure 11:
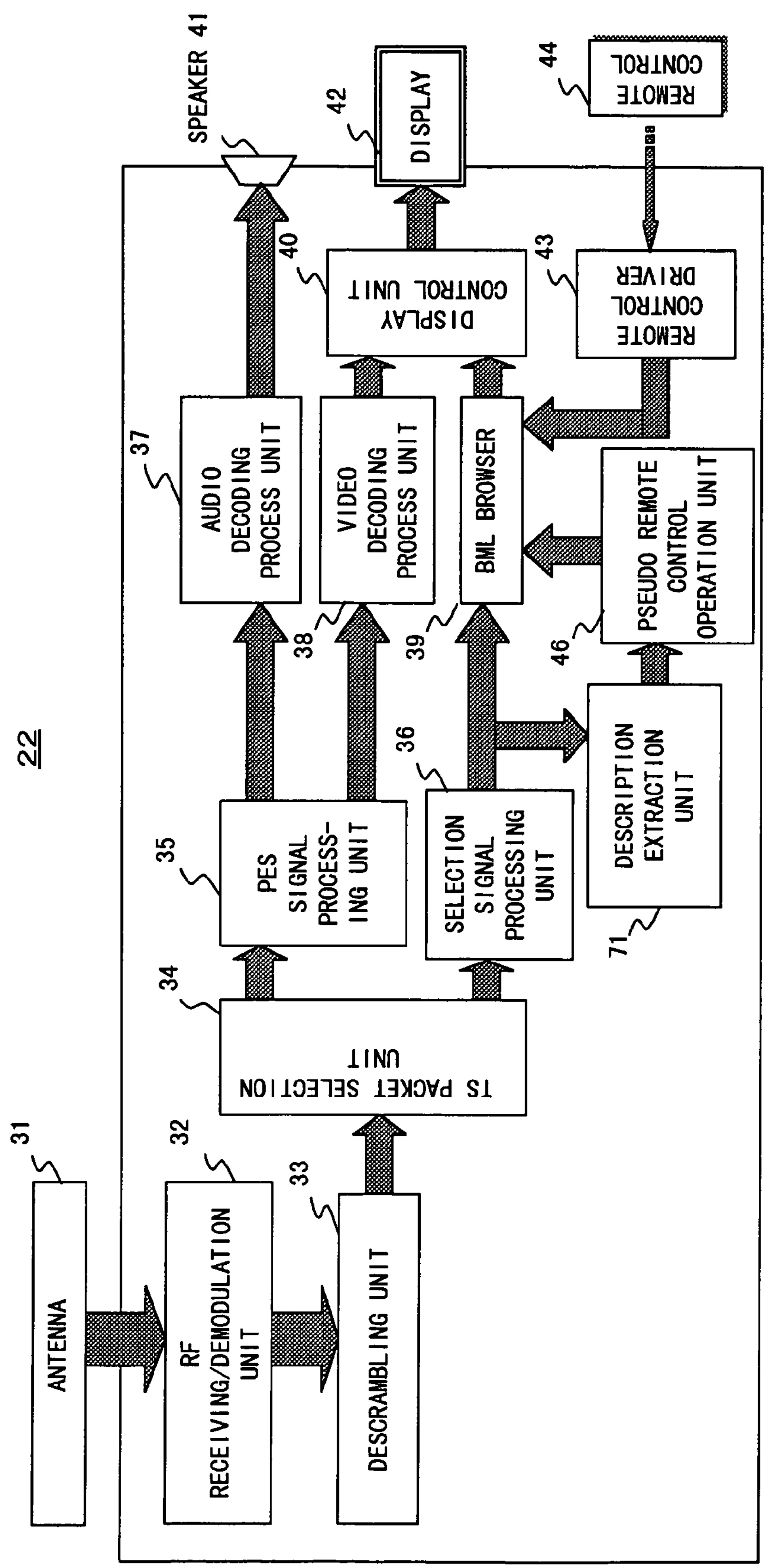
FIG. 11 shows the configuration of a second receiver.

For example, the BML browser 39, content analysis unit 45, pseudo remote control operation unit 46 and description extraction unit 71 shown in FIGS. 3 and 11 are stored in the memory 82 as programs.

The input device 83 includes, for example, a keyboard, a pointing device, a touch panel, etc., and are used to input both instructions from an operator and information. The output device 84 includes, for example, a display, a printer, a speaker, etc., and is used to output inquiries to an operator and process results. The speaker 41 and display 42 shown in FIGS. 3 and 11 correspond to the output device 84, and the remote control 44 corresponds to the input device 83.

The external storage device 85 includes, for example, a magnetic disk, an optical disk, a magneto-optical disk device, a tape device, etc. The information processing device stores both the program and data described above in this external storage device 85, and uses the program and data by loading them into the memory 82, if required.

The medium drive device 86 drives a portable storage medium 89 and accesses the recorded content. For the portable storage medium 89, an arbitrary computer-readable storage medium, such as a memory card, a floppy disk, a CD-ROM (compact-disk read-only memory), an optical disk, a magneto-optical disk, etc., are used. An operator stores both the program and data described above in this portable storage medium 89 and uses the program and data by loading them into the memory 82, if required.

The network connection device 87 is connected to an arbitrary communications network, such as a LAN (Local Area Network), etc., and transmits/receives data accompanying communications. The information processing device receives both the program and data described above from another device via the network connection device 87 and uses the program and data by loading them into the memory 82.

FIG. 17 shows computer-readable storage media that can supply the information processing device shown in FIG. 16 with both the program and data. Both the program and data stored in the portable storage medium 89 or the database of a server 90 are loaded into the memory 82. In this case, the server 90 generates a carrier signal for carrying both the program and data, and transmits both the program and data to the information processing device via an arbitrary transmitting medium on the network. Then, the CPU 81 performs necessary processes by using the data and executing the program.

According to the present invention, the broadcasting business operator of digital broadcasting and a viewer can easily confirm the content of data broadcasting without performing a troublesome selection operation.

What is claimed is:

1. A receiving apparatus, comprising:

a receiving device receiving a broadcast signal in digital broadcasting and outputting a baseband signal;

a selection device selecting, from the baseband signal, an elementary stream signal which includes a video stream and an audio stream, and a section signal which includes content information of data broadcasting, the content information including a plurality of pages;

a converting unit converting the section signal into the content information;

an instruction device generating, from the content information, instruction information to be used to automatically select a plurality of selection items, described in a language for data broadcasting and included in the pages of content information, the instruction information including a selection order list which covers selection operations for all the selection items to check whether the plurality of pages are output corresponding to the selection operations; and an output device outputting the content information to a broadcasting business operator while automatically selecting the plurality of selection items according to the instruction information, so that the content information output can be checked by the broadcasting business operator.

2. The receiving apparatus according to claim 1, further comprising: an analysis device extracting the plurality of selection items by analyzing the content information and generating an operational procedure for selecting the plurality of selection items in a prescribed order, and wherein said instruction device generates the instruction information based on the operational procedure.

3. The receiving apparatus according to claim 2, wherein said analysis device analyzes a link between the plurality of selection items and generates an operational procedure that covers the plurality of pages, and said instruction device generates instruction information for sequentially outputting the plurality of pages.

4. The receiving apparatus according to claim 1, further comprising an extracting device extracting an operational procedure for selecting the plurality of selection items in a prescribed order from the content information if the operational procedure is in advance described in the content information, and wherein said instruction device generates the instruction information according to the operational procedure.

5. The receiving apparatus according to claim 4, wherein said extraction device extracts information about an operational procedure that is generated by analyzing a link between the plurality of selection items and that covers the plurality of pages, and said instruction device generates instruction information for sequentially outputting the plurality of pages.

6. A broadcasting apparatus, comprising:

a generation device analyzing content information of data broadcasting in digital broadcasting and generating an operational procedure for automatically selecting a plurality of selection items described in a language for data broadcasting and included in a plurality of pages of the content information, the operational procedure including a selection order list which covers selection operations for all the selection items, so that a broadcasting business operator can check whether the plurality of pages are output corresponding to the selection operations;

a description device describing information about the operational procedure in the content information in such a way to output the content information according to the operation procedure; and an output device outputting a broadcast signal including an elementary stream signal which includes a video stream and an audio stream, and a section signal which includes content information in which information about the operational procedure is described.

7. A computer-readable storage medium on which is recorded a program for enabling a computer to execute a process, said process comprising:

analyzing a broadcast signal in digital broadcasting;

outputting a baseband signal;

selecting, from the baseband signal, an elementary stream signal which includes a video stream and an audio stream, and a section signal which includes content information of data broadcasting, the content information including a plurality of pages;

converting the section signal into the content information;

extracting a plurality of selection items, described in a language for data broadcasting, from the pages of content information; and generating an operational procedure for automatically selecting the plurality of selection items in such a way to output the content information to a broadcasting business operator while automatically selecting the plurality of selection items, the operational procedure including a selection order list which covers selection operations for all the selection items to check whether the plurality of pages are output corresponding to the selection operations, so that the content information output can be checked by the broadcasting business operator.

8. A confirmation method, comprising:

broadcasting a broadcast signal;

outputting a baseband signal;

selecting, from the baseband signal, an elementary stream signal which includes a video stream and an audio stream, and a section signal which includes content information of data broadcasting, the content information including a plurality of pages;

converting the section signal into the content information;

generating, from the content information, instruction information for automatically selecting a plurality of selection items, described in a language for data broadcasting and included in the pages of content information, from the content information, the generated instruction information including a selection order list which covers selection operations for all the selection items to check whether the plurality of pages are output corresponding to the selection operations;

outputting the content information while automatically selecting the plurality of selection items according to the instruction information; and confirming the content information output, by a broadcasting business operator.

9. A receiving apparatus, comprising:

receiving means for receiving a broadcast signal and outputting a baseband signal;

selection means for selecting, from the baseband signal, an elementary stream signal which includes a video stream and an audio stream, and a section signal which includes content information of data broadcasting, the content information including a plurality of pages;

conversion means for converting the section signal into the content information;

instruction means for generating, from the content information, instruction information to be used to automatically select a plurality of selection items, described in a language for data broadcasting and included in the pages of content information, the instruction information including a selection order list which covers selection operations for all the selection items to check whether the plurality of pages are output corresponding to the selection operations; and output means for outputting the content information to a broadcasting business operator while automatically selecting the plurality of selection items according to the instruction information, so that the content information can be checked by the broadcasting business operator.

10. A broadcasting apparatus, comprising:

generation means for analyzing content information of data broadcasting in digital broadcasting and generating an operational procedure for automatically selecting a plurality of selection items described in a language for data broadcasting and included in a plurality of pages the content information, the operational procedure including a selection order list which covers selection operations for all the selection items, so that a broadcasting business operator can check whether the plurality of pages are output corresponding to the selection operations;

description means for describing information about the operational procedure in the content information in such a way to output the content information in the operation procedure; and output means for outputting a broadcast signal including an elementary stream signal which includes a video stream and an audio stream, and a section signal which includes content information in which information about the operational procedure is described.

11. A propagating signal for propagating to a computer a program which enables the computer to execute a process, said process comprising:

analyzing a broadcast signal in digital broadcasting;

outputting a baseband signal;

selecting, from the baseband signal, an elementary stream signal which includes a video stream and an audio stream, and a section signal which includes content information of data broadcasting, the content information including a plurality of pages;

converting the section signal into the content information;

extracting a plurality of selection items described in a language for data broadcasting and from the pages of content information, the generated instruction information including a selection order list which covers selection operations by for all the selection items to check whether the plurality of pages are output corresponding to the selection operations; and generating an operational procedure for automatically selecting the plurality of selection items so that the content information can be outputted to a broadcasting business operator while automatically selecting the plurality of selection items, the operational procedure covering selection operations for all the selection items to check whether the plurality of pages are output corresponding to the selection operations, so that the content information output can be checked by the broadcasting business operator.

* * * * *